(12) United States Patent
Watanabe et al.

(10) Patent No.: US 8,295,616 B2
(45) Date of Patent: Oct. 23, 2012

(54) IMAGE PROCESSING DEVICE AND METHOD FOR IMAGE PROCESSING

(75) Inventors: Mariko Watanabe, Shiojiri (JP); Toshiaki Isobe, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 941 days.

(21) Appl. No.: 12/360,508

(22) Filed: Jan. 27, 2009

(65) Prior Publication Data

US 2009/0190848 A1    Jul. 30, 2009

(30) Foreign Application Priority Data

Jan. 29, 2008    (JP) .................................. 2008-017825

(51) Int. Cl.
*G06K 9/36*    (2006.01)

(52) U.S. Cl. ........ 382/232; 382/233; 382/239; 382/250; 382/251

(58) Field of Classification Search .................. 382/232, 382/233, 250, 251, 239; 348/384.1, 440.1; 375/122, 240.01, 240.12, 240.16; 345/555; 358/426.01, 426.16
See application file for complete search history.

(56) References Cited

U.S. PATENT DOCUMENTS

| 7,092,965 B2 * | 8/2006 | Easwar ................................. 1/1 |
| 7,194,140 B2 | 3/2007 | Ito et al. |
| 2001/0019630 A1 * | 9/2001 | Johnson ........................ 382/232 |

FOREIGN PATENT DOCUMENTS

| JP | 05-064001 | 3/1993 |
| JP | 10-051642 | 2/1998 |
| JP | 2003101786 A | 4/2003 |
| JP | 2003209698 A | 7/2003 |
| JP | 2004-159069 | 6/2004 |
| JP | 2006-157444 | 6/2006 |
| JP | 2006140868 A | 6/2006 |
| JP | 2007-013266 | 1/2007 |
| JP | 2007-221724 | 8/2007 |

* cited by examiner

*Primary Examiner* — Ali Bayat
(74) *Attorney, Agent, or Firm* — DLA Piper LLP (US)

(57) ABSTRACT

An image processing device configured to compress image data to be used for printing with a plurality of compression levels having different compression rates includes a former stage compression unit, a storing unit and a latter stage compression unit. The latter stage compression unit is configured, after the former stage compression unit finishes compressing all of the areas, to recompress each of areas of a latest compression level at the moment being different from a compression level stored in the storing unit with the latest compression level.

4 Claims, 5 Drawing Sheets

IMAGE PROCESSING DEVICE AND METHOD FOR IMAGE PROCESSING

BACKGROUND

1. Technical Field

The present invention relates to an image processing device configured to compress image data to be used for printing, etc., and in particular an image processing device configured to perform faster printing of images of higher quality with a limited memory size necessary for data storage, etc.

2. Related Art

It is generally known that a page printer such as a laser printer is configured to generate image data of an image to be printed on the basis of a print request, and to perform a printing process in accordance with the image data. So as to efficiently use the capacity of a built-in memory, the page printer usually compresses the generated image data, stores the compressed data in the memory and decompresses the stored data to be used for the printing process.

Various kinds of methods for compressing image data, which use reversible compression and irreversible compression, may be used for compressing the image data as described above. The compression rates of each of the methods are usually traded off against image quality obtained after decompression. If the image data are compressed with a high compression rate, the image quality may usually be degraded in the printing process using the compressed data.

Several methods have been disclosed with respect to such compression of image data. For example, a device configured to perform faster printing of images of higher quality without having to increase a memory size is disclosed in JP-2006-157444. The device of JP-2006-157444 is configured to compress data to be printed on a line-by-line basis, and to further compress the data on a page-by-page basis if the compressed data of a page still has a size larger than a desired size.

Another device configured to reduce processing time without enlarging a circuit scale is disclosed in JP-2007-13266. The device of JP-2007-13266 is configured to compress an image on a divided area-by-area basis by using a selected compression parameter, and to recompress the image by using a compression parameter of a higher compression rate if the compressed image is estimated not to be contained in a compression data storage area.

As the device of JP-2006-157444, however, compresses the data on a line-by-line basis before reaching a uniform compression rate, different compression methods may be applied to lines of different data as a matter of course. In this case, if the compression method is irreversible, reproducibility after decompression may differ among the lines. There is a problem that an image formed on the basis of the compressed data may possibly lose homogeneity, and that the image quality may possibly be degraded thereby.

The device of JP-2007-13266 may need long processing time for processing all the compressed data and recompressing the image from a first divided area by using a new compression parameter if the compressed image is estimated not to be contained in the compression data storage area. In a case where, in particular, no less than three compression parameters of different compression rates are used, there is a problem that the device of JP-2007-13266 may possibly take long processing time.

SUMMARY

An advantage of some aspects of the invention is to provide an image processing device configured to compress image data to be used for printing, and to perform faster printing of images of higher quality with a limited memory size necessary for data storage.

According to an aspect of the invention, an image processing device configured to compress image data to be used for printing with a plurality of compression levels having different compression rates includes a former stage compression unit, a storing unit and a latter stage compression unit. The former stage compression unit is configured to perform a compression process of each of a plurality of areas into which the image data is divided with a latest compression level which is one of the compression levels set up at the moment. The former stage compression unit is configured, in a case where a size of the compressed image data of each of the areas is not smaller than a determined value, to repetitively update the latest compression level to a one rank higher one of the compression levels so as to compress the image data with the updated latest compression level until the size of the compressed image data becomes smaller than the determined value. The storing unit is configured to store the latest compression level and the compression level with which the image data of each of the areas is compressed to the size smaller than the determined value. The latter stage compression unit is configured, after the former stage compression unit finishes compressing all of the areas, to recompress each of the areas of the latest compression level at the moment being different from the compression level stored in the storing unit with the latest compression level.

It is preferable that the compression levels of the image processing device according to Claim 1 is counted to be no fewer than three.

It is preferable that the latest compression level of the image processing device according to Claim 1 is specified by a user before the former stage compression unit starts the compression process, and that the image data has been compressed with one of the compression levels which is different from the specified latest compression level after the latest compression level is updated.

According to another aspect of the invention, a method for image processing of an image processing device configured to compress image data to be used for printing with a plurality of compression levels having different compression rates includes a step of former stage compression, a step of storing the latest compression level and the compression level with which the image data of each of the areas is compressed to the size smaller than the determined value, and a step of latter stage compression. The step of former stage compression includes performing a compression process of each of a plurality of areas into which the image data is divided with a latest compression level which is one of the compression levels set up at the moment, and repetitively updating the latest compression level to a one rank higher one of the compression levels, in a case where a size of the compressed image data of each of the areas is not smaller than a determined value, so as to compress the image data with the updated latest compression level until the size of the compressed image data becomes smaller than the determined value. The step of latter stage compression includes recompressing each of the areas of the latest compression level at the moment being different from the compression level stored in the storing unit with the latest compression level, after the step of the former stage compression finishes compressing all of the areas.

DESCRIPTION OF EXEMPLARY EMBODIMENTS

An embodiment of the invention will be described with reference to the drawings. The embodiment, however, does not limit the scope of the invention. Portions shown in the drawings that are the same or similar to each other are given the same reference numerals or reference codes.

Figure 1:
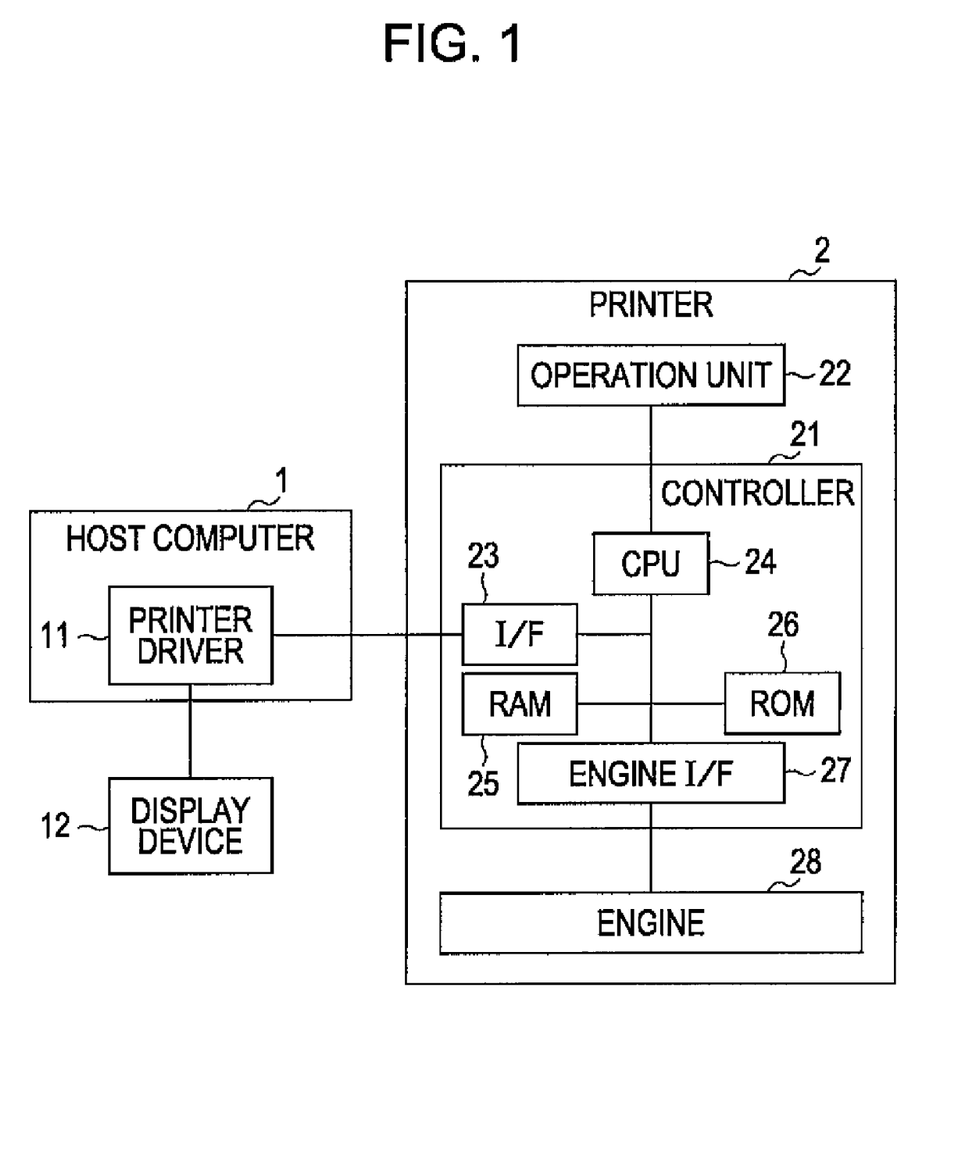
FIG. 1 is a block diagram of a printer having an image processing device of an embodiment of the invention.

FIG. 1 is a block diagram of a printer of the embodiment having an image processing device to which the invention is applied. FIG. 1 shows a printer 2 having a controller 21 that is the image processing device to which the invention is applied. Having received a print request, the controller 21 generates image data of an image to be printed and compresses the image data on a so-called band-by-band basis. Having prepared a plurality of compression levels having different compression rates, the controller 21 starts a compression process in order of bands by using a selected one of the compression rates. The controller 21 judges for each of the bands whether a data size after the compression is smaller than a determined value. If not, the controller 21 repeats selection of a compression level one rank higher and recompression with the selected compression level until the data size is reduced to a value smaller than the determined value. Then, the selected compression level is used in a process for the next band. After completing the process on a band-by-band basis for all of the bands, the controller 21 performs a recompression process so as to adjust the compression level of each of the bands to a finally selected compression level. The controller 21 performs the compression process for the image data as described above so as to perform faster printing of images of higher quality with a limited memory size necessary for data storage.

FIG. 1 shows a host computer 1 that is a host device configured to provide the printer 2 with the print request. The host computer 1 may send print data including the image data and a control command to the printer 2. The host computer 1 may be a so-called personal computer, etc.

The host computer 1 includes a printer driver 11 configured to receive data from an application (not shown) of the host computer 1 and to generate the print data to be sent to the printer 2. The printer driver 11 is formed by a program that may direct a process of the above function, a control device (not shown) of the host computer 1 that may perform the process according to the program, and so on. The host computer 1 includes a display device 12. The host computer 1 may enable a user to select a method of the compression process of the printer 2 described above before sending the print request to the printer 2. The application or the printer driver 11 may provide the display device 12 with an interface screen for the above selection.

As shown in FIG. 1, the printer 2 is a laser printer constituted by a controller 21, an engine 28, an operation unit 22 and so on.

The controller 21 may receive the print data sent from the host computer 1, interpret the control command included in the print data and generate data to be provided to the engine 28 by processing the image data included in the print data in a determined manner. As shown in FIG. 1, the controller 21 includes an I/F 23, a CPU 24, a RAM 25, a ROM 26, an engine I/F 27 and so on.

The I/F 23 is configured to receive the print data sent from the host computer 1. The ROM 26 is configured to store various kinds of programs for controlling the printer 2.

The RAM 25 is a memory configured to store the received print data, and to provide the engine I/F 27 with the image data of each page to be processed for printing by the engine 28. The above image data of each page are stored in the RAM 25 as output data of the compression process described above, and are provided to the engine I/F 27 to be decompressed. As described later, the RAM 25 may store information of the compression level adopted by the compression process of each band.

The CPU 24 is configured to control various processes of the printer 2, particularly such as a process of storing the image data included in the received print data in the RAM 25, a process of interpreting the control command included in the print data and directing a proper printing process to the engine 28, a process of controlling the operation unit 22 so as to form a user interface, and so on. The compression process of the image data performed by the CPU 24 is a specific feature of the printer 2, and details thereof will be described later. The process performed by the CPU 24 is performed in accordance with the programs stored in the ROM 26.

The engine I/F 27 is an interface between the controller 21 and the engine 28 configured to read out the image data stored in the RAM 25 described above at a determined timing, to process the image data in a determined manner and to provide the engine 28 with the processed image data. Although not shown, the engine I/F 27 has a memory for temporarily storing data, a decompression unit, a screen processor and so on which are configured to decompress the compressed data read out from the RAM 25, to convert the data into dot data, i.e., screen processing, and so on. The engine I/F is specifically formed by an ASIC.

Although not shown, the engine 28 is constituted by an electrifying unit, an exposure unit, a development unit, a transcription unit, a fixing unit and so on. The engine 28 is configured to perform a printing process on the basis of the data received from the engine I/F 27 and in accordance with a print direction from the CPU 24, so as to form an image according to the print request on a determined print medium.

The operation unit 22 shown in FIG. 1 is a portion used by a user for operating the printer 2, and is constituted by a display panel, operation keys and so on.

The controller 21 of the printer 2 of the embodiment configured as described above may perform a printing process in a sequence described below.

If, at first, the application, etc., of the host computer 1 is provided with a print request made by a user, the printer driver 11 generates the print data described above, and transmits the data described in a PDL (page description language) to the printer 2. The user may specify a compression method of the printer 2 for compressing image data while making the print request.

Figure 2:
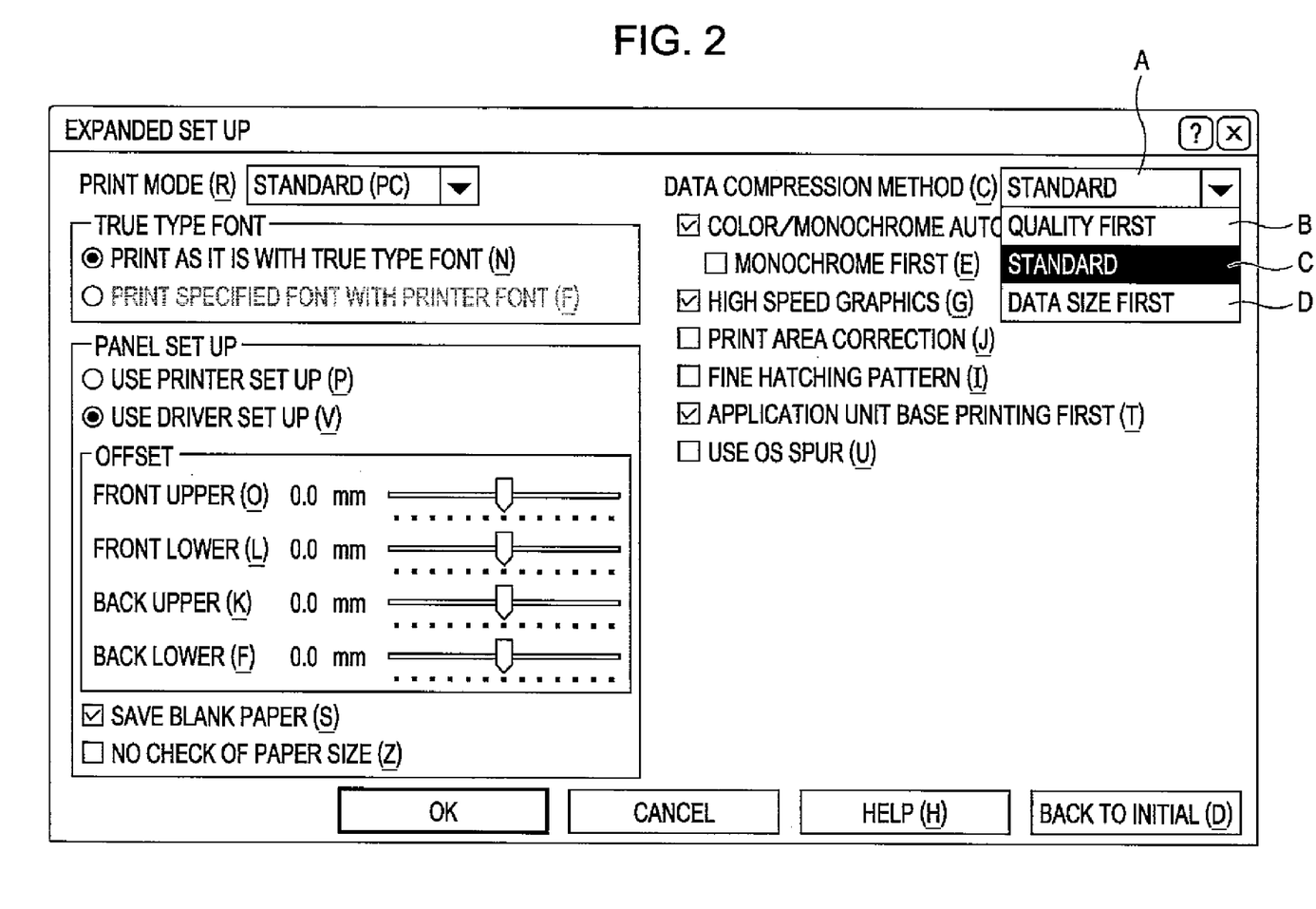
FIG. 2 is an example of a user interface screen prepared for specifying a compression method of image data.

FIG. 2 is an example of a user interface screen prepared for specifying the compression method. FIG. 2 is an example of a screen displayed on the display device 12 of the host computer 1 for making the print request, and one of screens on which a user may set up various print conditions. The user may specify the above compression method in a portion indicated by "A" shown in FIG. 2 by selecting a desired method from "quality first (B)", "standard (C)" and "data size first (C)". In FIG. 2, e.g., a "standard (C)" mode is being selected.

If a "quality first (B)" mode is selected, a reversible compression method will be adopted in a compression process of image data described later. If the "standard (C)" mode or a "data size first (C)" mode is selected, an irreversible compression method will be adopted in the compression process.

Then, the printer 2 receives the above transmitted print data. The CPU 24 interprets a control command included in the print data, converts image data included in the print data to a determined intermediate code, and stores the converted image data in the RAM 25. Then, the CPU 24 develops the intermediate code into image data for each of pixels. More specifically, the CPU 24 generates data having a density gradation value of each of RGB (red, green and blue) colors for each of the pixels.

Then, the CPU 24 performs a color conversion process by converting the image data of the above RGB form into image data of a CMYK (cyan, magenta, yellow and black) form. The CPU 24 compresses the image data of the CMYK form and stores the compressed image data in the RAM 25. The CPU 24 performs the above development and color conversion processes for each of plural areas (bands) into which an image of one page is divided. The compression process is provided with the image data of the CMYK form of one band after another band.

As the received control command includes information regarding the compression method (mode) specified by the user in the above compression process, the CPU 24 judges whether to perform reversible compression or irreversible compression on the basis of the information. In a case where the "quality first (B)" mode is selected, the CPU 24 determines to perform the reversible compression. The reversible compression usually has a lower compression rate but provides better image quality than the irreversible compression, as a compressed image may return to an original state after decompression. Thus, if the user selects "quality first", the CPU 24 performs the reversible compression as described above. The CPU 24 may use a known compression method for this reversible compression process. In this case, the CPU 24 stores the compressed data after the reversible compression process in determined portions of the RAM 25 in order.

Meanwhile, in a case where the user selects a mode other than the "quality first" mode, the CPU 24 determines to perform the irreversible compression. Then, the CPU 24 performs the irreversible compression process for the provided image data. The irreversible compression process has a specific feature that will be described later. The CPU 24 stores the data after the compression process in the determined portions of the RAM 25 in a similar manner.

If the compressed image data of one page have been stored in the RAM 25 as described above, the engine I/F 27 reads out the compressed data, performs the process described above, and provides the engine 28 with the processed data in order.

Figure 3:
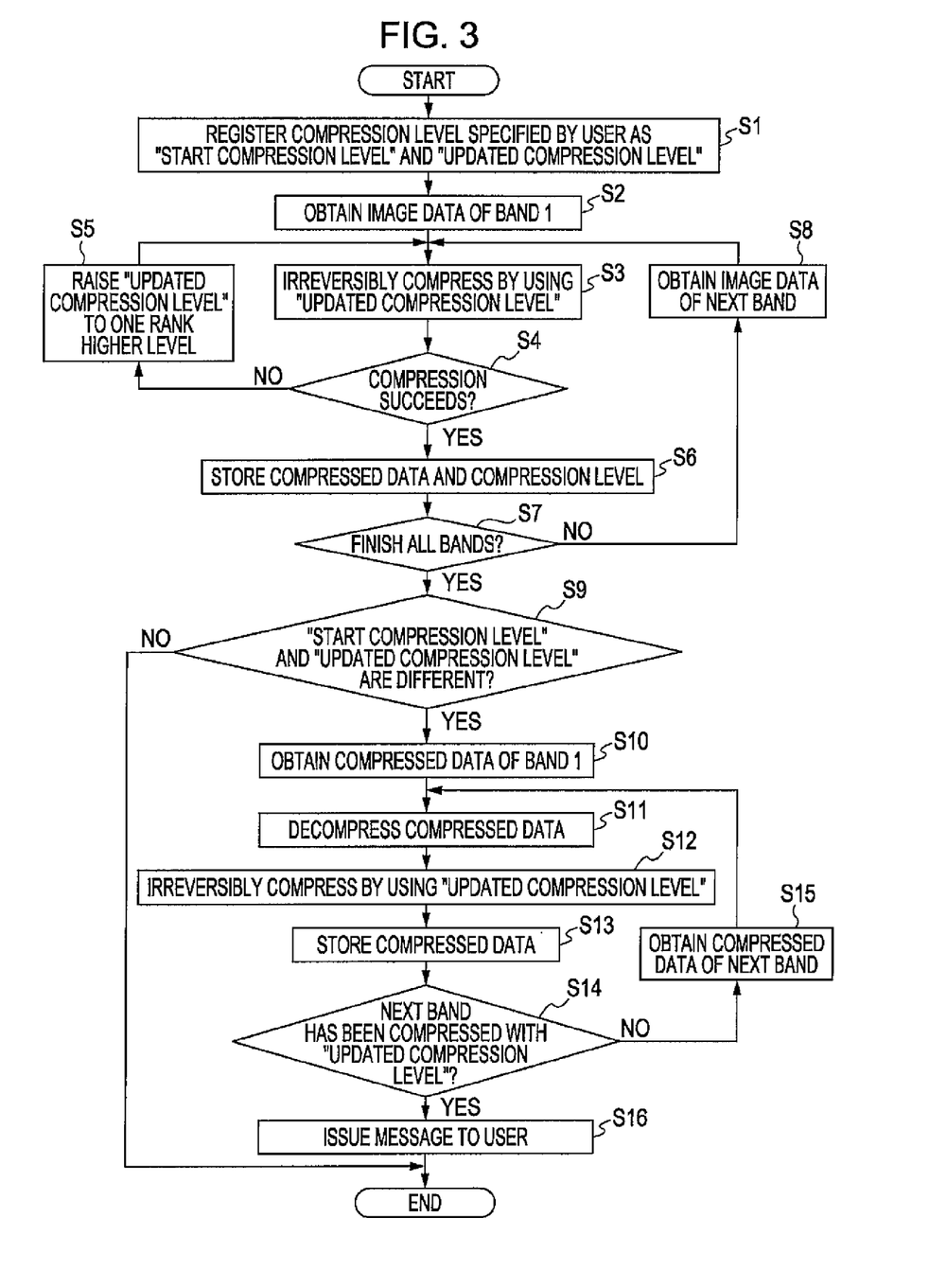
FIG. 3 is a flow chart exemplifying a flow of a compression process.

The controller 21 performs the process as described above. The irreversible compression process has a specific feature, as described above, which will be described below. FIG. 3 is a flow chart exemplifying a flow of the compression process.

Figure 4:
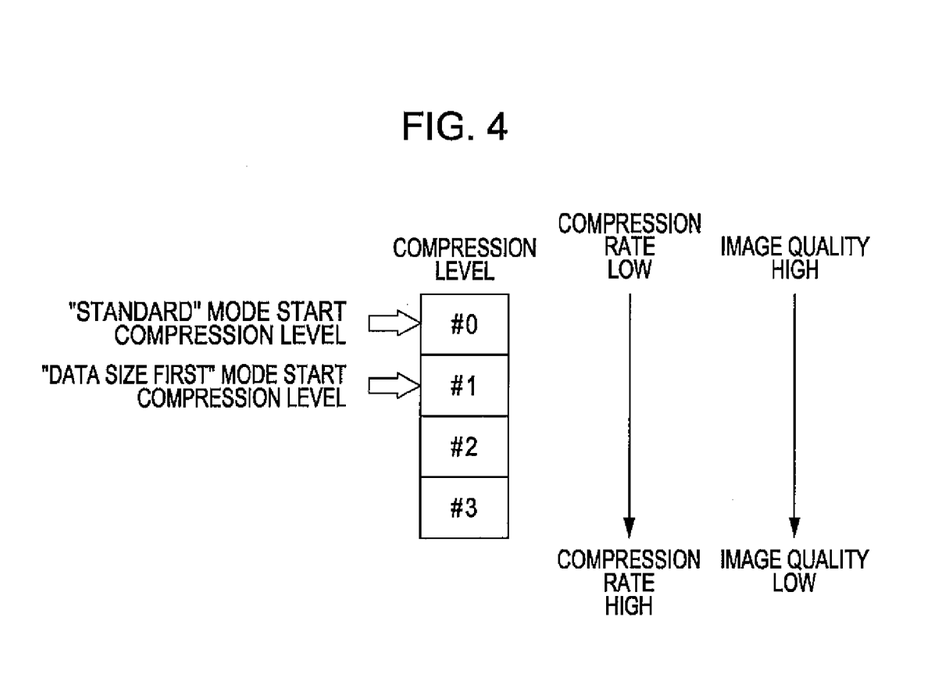
FIG. 4 is a diagram illustrating compression levels.

The printer 2 has, e.g., four compression levels (#0-3) of the irreversible compression. FIG. 4 illustrates the compression levels. Among the four compression levels, as shown in FIG. 4, the compression level #0 has the lowest compression rate, and a higher compression level has a higher compression rate. Meanwhile, a higher compression level results in lower quality of an image (image quality) formed after compression by using each of the compression levels. In other words, reproducibility after decompression is degraded. These compression levels may be provided by irreversible compression, e.g., of a JPEG form having different compression parameters. In this case, the compression parameter corresponding to each of the compression levels may be stored in the ROM 26, etc., and the compression process may be performed by proper selection and use of the parameter.

If the user selects the "standard" compression mode described above, as shown in FIG. 4, the compression level #0 is selected as a start compression level in the compression process described below. If the user selects the "data size first" compression mode, the compression level #1 is selected as the start compression level.

The compression process for one page will be described below with reference to FIG. 3.

If determining to perform the irreversible compression as described above, the CPU 24 sets up (registers) the compression level corresponding to the compression mode specified by the user as values of the "start compression level" and an "updated compression level", which are parameters of the process (step S1).

Then, the CPU 24 obtains image data of a first band (band 1) of a page to be processed (step S2). More specifically, the CPU 24 obtains the image data of the CMYK form of the band 1 provided by the pre-compression process described above.

The CPU 24 irreversibly compresses the obtained image data by using the compression level registered as the "updated compression level" (step S3). As the "start compression level" and the "updated compression level" are the same in the first process of the band 1, the CPU 24 performs the compression process by using the compression levels #0 and #1 if the user selects the "standard" compression mode and the "data size first" compression mode, respectively, as described above. More specifically, reading out the compression parameter corresponding to each of the compression levels, the CPU 24 performs the irreversible compression by using the parameter.

Figure 5A:
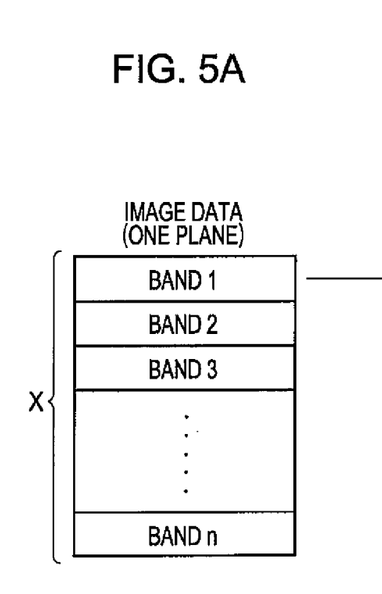
FIGS. 5A and 5B are diagrams illustrating a size of image data to be compressed.
Figure 5B:
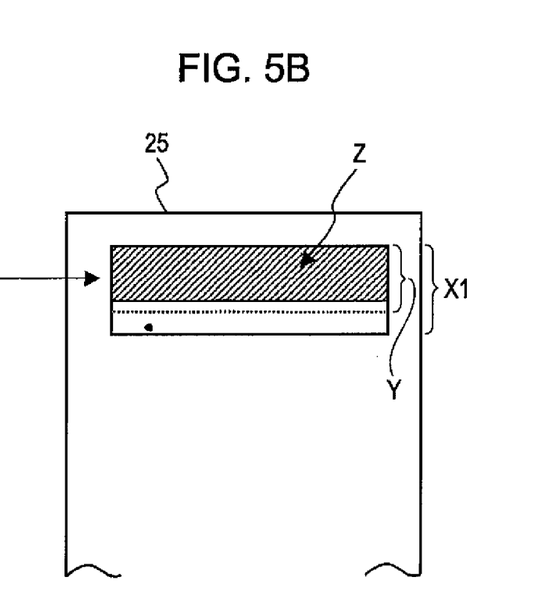

Then, the CPU 24 judges whether a data size after the above compression process is smaller than a determined volume (a threshold). If the data size is smaller than the determined volume, the CPU 24 judges that the compression has succeeded. If not, the CPU 24 judges that the compression has failed (step S4). FIGS. 5A and 5B illustrate the size of the compressed image data. FIG. 5A shows image data of one page and one color (one plane) before the compression process. As each of the CMYK colors is used as a color material, the printer 2 generates such data for each of the CMYK colors. As the data generation process is performed separately for each of the bands, the printer 2 need not hold data for a whole plane at once. As described above, one page is divided into plural band areas (1-*n*), and the above compression process (S3) is performed in order of the band numbers (in order from the upper band to the lower band in FIG. 5). The compression process of each of the bands (S3) is performed for each of the CMYK colors.

FIG. 5A shows a data size X of one plane that is a value determined by a paper size and resolution of printing. The printer 2 holds in the RAM 25 a storage area of a size of a determined ratio (e.g., 80 percent) to the data size X (e.g., X times 0.8) for the compressed image data of one plane. The above judging process (S4) after the compression process is performed for each of the colors (each of the planes) provided that the data size of each of the bands before the compression process (e.g., X/n, X1 shown in FIG. 5B) times the above ratio (e.g., 80 percent) is a value Y shown in FIG. 5B that equals the above determined volume (the threshold). As shown in FIG. 5B, e.g., as the data size Z of the band 1 after the compression process is smaller than the threshold Y, the CPU 24 judges that the compression has succeeded. The CPU 24 gives the threshold Y a determined value beforehand on the basis of information such as the paper size, etc., obtained by interpreting the control command.

If a volume of at least one of the colors is not smaller than the threshold Y in the above judging process of each of the colors, the CPU 24 judges that the compression of the band has failed. In other words, if the compressed data is of a volume smaller than the above threshold Y for every one of the CMYK colors, the CPU 24 judges that the compression has succeeded.

The CPU 24 judges whether the compression has succeeded or failed as described above. If judging that the compression has failed ("No" of step 4), the CPU 24 raises the "latest compression level" to a level one rank higher (step S5) than the current level (step S5). More specifically, the CPU 24 sets up the compression level having a number larger than the number of the current "latest compression level" by one as the "latest compression level". If, e.g., the compression level currently set up is the compression level #0, the "latest compression level" is updated to the compression level #1. That is, a compression level one rank higher is set up.

Then, the process goes to the step S3 again. In this way, the above update process (S5) of the "latest compression level" and the compression process (S3) by using the updated "latest compression level" are repeated until the compression process succeeds for the band to be processed, in other words until the size becomes smaller than the threshold Y for every one of the CMYK colors. That is, the CPU 24 performs the compression process by raising the compression rate in order until the data size becomes smaller than the determined volume.

If the CPU 24 judges that the compression has succeeded ("Yes" of step S4), the CPU 24 stores the data after the compression (compressed data) and the value of the compression level currently set as the "latest compression level", i.e., the compression level used for generating the compressed data, in a determined portion of the RAM 25 in such a manner that the band to be processed may be identified (step S6).

After finishing the process of one of the bands in this way, the CPU 24 judges whether the processes of all of the bands of the page to be processed have finished (step S7). If not (the process has not finished up to the band n) ("No" of step S7), the process moves to a next band, and the CPU 24 obtains image data of the next band as at the step S2 (step S8). After the process of the band 1 finishes, e.g., the image data of the band 2 are obtained.

Then, the process goes back to the step S3, and a similar compression process is performed for the band from which the image data are obtained (S3-S6). After the process moves to the next band, the value of the "latest compression level" is not initialized. The value of the "latest compression level" remains the value of the compression level finally used for the process of the previous band. The compression process starts performing the compression process of the next band by using that value of the compression level.

After finishing the process of all of the bands as described above ("Yes" of step S7), the CPU 24 finishes a process of a former stage by using the irreversible compression. The compressed data of the page to be processed are stored in the determined portion of the RAM 25. The compression parameter and the threshold Y are set up in such a manner that the compression process of ordinary data may succeed in a case where the CPU 24 performs the compression process (S3) by using the compression level #3 of the highest compression rate of the printer 2.

Then, starting a process of a latter stage of the compression process, the CPU 24 checks whether the compression level set up as the "start compression level" and the compression level set up as the "latest compression level" are different from each other (step S9). Although the "start compression level" remains the value registered at the step S1, the "latest compression level" may have been possibly updated as described above.

If both of the levels are not different as a result of the above check ("No" of step S9), the CPU 24 skips the process of the latter stage for the page and finishes the irreversible compression process with the compressed data generated and stored in the process of the former stage.

Meanwhile, if both of the levels are different as a result of the above check ("Yes" of step S9), the CPU 24 reads out (obtains) the compressed data stored in the process of the former stage (step S10), and decompresses (expands) the data (step S11).

Then, the CPU 24 recompresses the decompressed image data of the band by using the compression level currently set as the "latest compression level" (step S12) In a case where, e.g., the compressed data of the band 1 has been processed with the compression level #1, and the "latest compression level" currently set, i.e., the compression level with which the compression of the final band n succeeds is the compression level #3, the image data of the band 1 is recompressed with the compression level #3.

The compressed data that have been recompressed are stored in the determined portion of the RAM 25 again (step S13). That is, the CPU 24 replaces the compressed data stored in the process of the former stage with the data compressed with a new compression level. As the compression level of a high compression rate at the step S12 is adopted compared with that in the process of the former stage, the compressed data of one of the colors is of a size smaller than the threshold Y described above.

After finishing the process of one of the bands in this way, the CPU 24 checks the bands in numerical order to determine whether the next band has been processed in the process of the former stage with the "latest compression level" currently set (step S14). In other words, the CPU 24 checks whether the next band has been finally compressed with the compression level with which the compression of the final band n is successful. More specifically, the CPU 24 reads out the value of the "latest compression level" of the band (next band) stored in the RAM 25 at the step S6 in the process of the former stage, and checks whether the read out value equals the "latest compression level" currently set. In a case where, e.g., the compression of the band 2 has been successful with the compression level #2 in the process of the former stage and the "latest compression level" currently set is the compression level #3, the CPU 24 judges that the compression process has not been performed with the "latest compression level" currently set.

If the CPU 24 judges that the compression process has not been performed with the "latest compression level" currently set as a result of the above check ("N" of step S14), the CPU 24 reads out and obtains the compression data of the next band stored in the RAM 25 as at the step S10 (step S15), and performs the process from the step S11 described above. That is, the CPU 24 recompresses the data of the band with the "latest compression level" currently set and updates the compressed data.

Meanwhile, if judging that the compression process has been performed with the "latest compression level" currently set as a result of the above check ("Yes" of step S14), the CPU 24 finishes the above recompression process of each of the bands, and issues a message to the user (step S16). More specifically, the CPU 24 instructs the display device 12 of the host computer 1 or the operation unit 22 of the printer 2 to display on a display panel a message indicating that the compression process has been performed with a compression level of a higher compression rate and lower image quality than the compression level corresponding to the compression mode specified by the user, such as "printed with lower quality". Because, as described above, the "start compression level" that is the compression level corresponding to the compression mode specified by the user is different from the "latest compression level" with which the compression process has been actually performed, and the "latest compression level" is of a higher compression level (compression rate) in this case.

In this way, the CPU 24 finishes the process in a case where the "start compression level" and the "latest compression level" are different from each other ("Yes" of step S9). As a result, the compression data of all of the bands of the page compressed with the same "latest compression level" are stored in the RAM 25. In a case where the "start compression level" equals the "latest compression level" ("No" of step S9), an equal result is obtained as all of the bands have been processed with the same compression level in the process of the former stage and the compressed data are stored. As these compressed data have a smaller size than the threshold Y of each of the bands and one color, the stored compressed data of one page may be contained in the storage area secured in the RAM 25.

As described above, the compression process in a case where the irreversible compression has been selected is completed.

Figure 6:
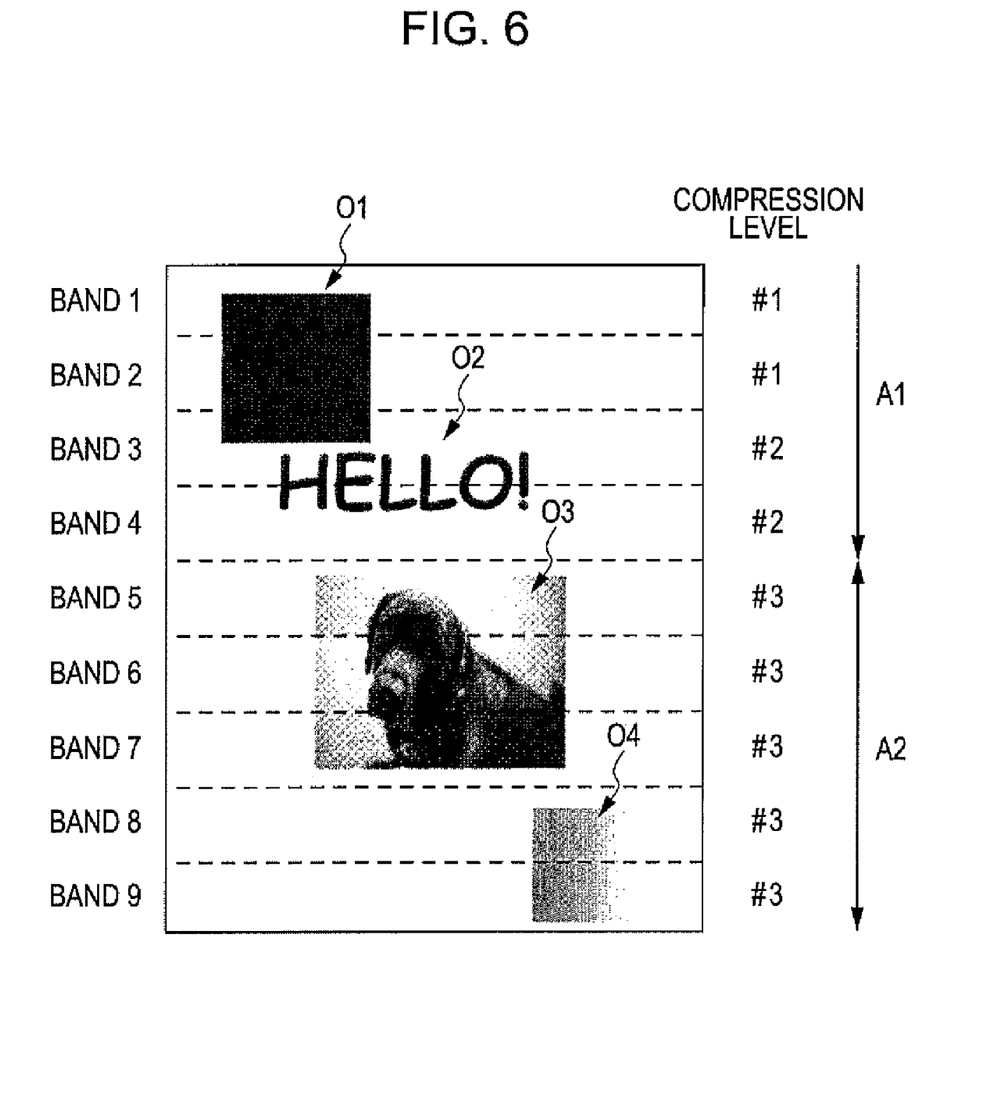
FIG. 6 is a diagram showing an example of an image compressed by the printer of the embodiment with a compression level applied to a process of a former stage.

FIG. 6 shows an example of an image compressed by the printer 2 with the compression levels applied to the process of the former stage. The image shown in FIG. 6 (one page) includes four objects to be drawn, O1-O4. The object O1 is a red figure (graphics) of equal density. The object O2 is a series of letters of different colors alphabet by alphabet. The object O3 is an image of a picture. The object O4 is a yellow figure given gradation (i.e., its density gradually changes).

If such an image is irreversibly compressed as described above and it is assumed that the "start compression level" is the compression level #1, the bands 1-2 are successfully compressed with the compression level #1 as the object O1 includes content that may be easily compressed to a small size.

Then, the band 3 is not successfully compressed with the compression level #1 as the object O2 includes content that may be compressed with some difficulty, and is successfully compressed with the compression level #2 after the compression level is raised to the one rank higher compression level #2.

Then, the band 4 is similarly successfully compressed with the compression level #2, and the process moves on to the band 5. As the object O3 includes content that may be compressed with further difficulty, the band 5 is successfully compressed with the one more rank higher compression level #3.

Then, the following bands are continuously compressed with the highest raised compression level, and the process of the former stage finishes. As including the object O4 that may be compressed more easily than the object O3, the bands 8-9 may possibly successfully be compressed with the compression level #2. The bands 8-9 are compressed, however, with the compression level #3, as the compression level is not lowered in accordance with the process described above. In addition, there is no need to compress the bands 8-9 with the compression level #2, as the compression level is finally unified.

Then, the process of the latter stage described above is performed. The bands 1-4 shown by "A1" in FIG. 6 are recompressed as described above with the compression level #3 in this case. As a matter of course, the bands 5-9 shown by "A2" in FIG. 6 are not recompressed.

After the process of the latter stage finishes in this way, the compressed data of the image uniformly compressed with the compression level #3 are completely stored in the RAM 25.

In the above description, image data for color printing using CMYK colors are compressed. Image data for monochrome printing may be similarly compressed.

As described above, the printer 2 prepares a plurality of compression levels for an irreversible compression process of image data. The printer 2 adopts a compression level of a low compression rate and high image quality as long as the compressed data is contained in a determined volume. The compression level is unified within one page. Thus, the printer 2 may avoid degraded image quality caused by variation of reproducibility of the image data within one page. As adopting the compression level of a low compression rate and high image quality as much as possible, the printer 2 may raise image quality of printing while saving a memory size necessary for storing the image data.

The recompression process for unifying the compression level (the process of the latter stage) is performed not each time the compression level is raised but at once after the final compression level is determined. Thus, the printer 2 may save processing time even in a case where the compression level is raised more than once.

The compression data processed in the process of the former stage are used for the recompression in the process of the latter stage. Thus, the printer 2 need not leave the image data provided to the compression process and the data before being compressed, and may efficiently use the memory. As decompressed for user the data compressed in the process of the former stage may cause some degradation of the image quality, but its degree is negligible.

As described above, the user may specify the compression mode. If the image data are not finally compressed with the compression level corresponding to the specified compression mode, a message indicating that fact is displayed to the user. Thus, the printer 2 is highly convenient for the user.

As described above with respect to the embodiment, the compressed data in the process of the former stage are decompressed so as to be used for the recompression in the process of the latter stage. Image data at a stage before the compression process (the intermediate code, the image data of the CMYK form, etc.) may be left and used for the recompression process.

The compression process of the image data of the above embodiment is performed by an operation of the CPU on a program basis. The process may be performed on a hardware basis.

The printer 2 of the above embodiment is a laser printer. The invention may be applied to a printer of another printing method.

Inventions described as the claims and their equivalents are within the scope of the invention that is not limited to the above embodiment.

The entire disclosure of Japanese Patent Application No. 2008-17825, filed Jan. 29, 2008 is expressly incorporated by reference herein.

What is claimed is:

1. An image processing device configured to compress image data to be used for printing with a plurality of compression levels having different compression rates, comprising:

a former stage compression unit configured to perform a compression process for each of a plurality of areas into which the image data is divided with a latest compression level which is one of the compression levels currently set, the former stage compression unit configured, in the case where a size of the compressed image data of each of the areas is not smaller than a determined value, to repetitively update the latest compression level to a compression level one rank higher so as to compress the image data with the updated latest compression level until the size of the compressed image data becomes smaller than the determined value;

a storing unit configured to store the latest compression level and the compression level with which the image data of each of the areas is compressed to a size smaller than the determined value; and a latter stage compression unit configured, after the former stage compression unit finishes compressing all of the areas, to recompress each of the areas of the latest compression level if the compression level is different from the latest compression level stored in the storing unit.

2. The image processing device according to claim 1, wherein the compression levels are no fewer than three.

3. The image processing device according to claim 1, wherein the latest compression level is specified by a user before the former stage compression unit starts the compression process, and the user is informed of a fact that the image data has been compressed with an updated compression level which is different from the latest compression level stored in the storing unit.

4. A method of image processing for an image processing device configured to compress image data to be used for printing with a plurality of compression levels having different compression rates, comprising:

a step of former stage compression including performing a compression process for each of a plurality of areas into which the image data is divided with a latest compression level which is one of the compression levels currently set, and repetitively updating the latest compression level to a compression level one rank higher, in a case where a size of the compressed image data of each of the areas is not smaller than a determined value, so as to compress the image data with the updated latest compression level until the size of the compressed image data becomes smaller than the determined value;

a step of storing the latest compression level and the compression level with which the image data of each of the areas is compressed to a size smaller than the determined value; and a step of latter stage compression including recompressing each of the areas of the latest compression level if the compression level is different from the latest compression level stored in the storing unit, after the step of the former stage compression finishes compressing all of the areas.

* * * * *